United States Patent
Han

(10) Patent No.: US 9,657,835 B2
(45) Date of Patent: May 23, 2017

(54) GEAR MOVING ASSEMBLY AND TRANSMISSION COMPRISING SAME

(71) Applicant: Eun-Su Han, Hwasung-si (KR)

(72) Inventor: Eun-Su Han, Hwasung-si (KR)

( * ) Notice: Subject to any disclaimer, the term of this patent is extended or adjusted under 35 U.S.C. 154(b) by 143 days.

(21) Appl. No.: 14/423,763

(22) PCT Filed: Jul. 8, 2013

(86) PCT No.: PCT/KR2013/006024
§ 371 (c)(1),
(2) Date: Feb. 25, 2015

(87) PCT Pub. No.: WO2014/035042
PCT Pub. Date: Mar. 6, 2014

(65) Prior Publication Data
US 2015/0323068 A1  Nov. 12, 2015

(30) Foreign Application Priority Data

Aug. 31, 2012 (KR) .................. 10-2012-0096048

(51) Int. Cl.
| | |
|---|---|
| *F16H 3/08* | (2006.01) |
| *F16H 63/08* | (2006.01) |
| *F16H 63/30* | (2006.01) |
| *F16H 3/083* | (2006.01) |
| *F16D 11/14* | (2006.01) |
| *F16H 3/089* | (2006.01) |
| *F16H 3/30* | (2006.01) |

(52) U.S. Cl.
CPC ............ *F16H 63/08* (2013.01); *F16D 11/14* (2013.01); *F16H 3/083* (2013.01); *F16H 3/089* (2013.01); *F16H 3/30* (2013.01); *F16H 63/3069* (2013.01); *F16H 2063/3073* (2013.01); *F16H 2063/3093* (2013.01); *Y10T 74/19474* (2015.01); *Y10T 74/20177* (2015.01)

(58) Field of Classification Search
CPC ..................... F16H 3/0915; F16H 2063/3079
USPC .................................. 74/355, 356, 373, 374
See application file for complete search history.

(56) References Cited

U.S. PATENT DOCUMENTS

| | | | | |
|---|---|---|---|---|
| 4,505,164 A | * | 3/1985 | Yoshida | ................. F16H 3/083 74/337 |
| 4,716,778 A | * | 1/1988 | Scarpino | ................. F16H 3/083 74/371 |
| 7,997,159 B2 | * | 8/2011 | Hemphill | ................ F16D 21/04 475/298 |

(Continued)

*Primary Examiner* — Ha D Ho
(74) *Attorney, Agent, or Firm* — LRK Patent Law Firm

(57) ABSTRACT

A gear moving assembly includes: a tubular shaft having a hollow portion formed therein; a sliding unit including: a base disposed in the hollow portion of the shaft, and a plurality of sliders including respective rods that are disposed in the respective sliding channels to be slidable relative to the shaft in the longitudinal direction; a plurality of movable gears disposed around a circumferential surface of the shaft to be movable relative to the shaft in the longitudinal direction, and provided to correspond to the respective sliders; and a plurality of interlocking units configured to connect the sliders to the corresponding movable gears so that sliding of each of the sliders is independently interlocked with movement of the corresponding movable gear. A transmission includes the gear moving assembly.

14 Claims, 5 Drawing Sheets

(56) References Cited

U.S. PATENT DOCUMENTS

| | | | |
|---|---|---|---|
| 9,239,109 B2* | 1/2016 | Reisch | F16D 21/04 |
| 2012/0090421 A1* | 4/2012 | Hagberg | F16H 61/32 |
| | | | 74/473.12 |

* cited by examiner

GEAR MOVING ASSEMBLY AND TRANSMISSION COMPRISING SAME

TECHNICAL FIELD

The present invention relates to a gear moving assembly and a transmission including the same.

BACKGROUND ART

Transmissions are devices that change the speed or torque of driving units that are mounted in automobiles, bicycles, etc. Transmissions are widely used in various forms in industrial and transport machines and general apparatus and mechanism fields that require a difference in speed between an input unit and an output unit.

In general, transmissions typically include a gear system, and implement a desired number of gear stages based on the gear ratio, i.e., the ratio of an input revolutions per minute (RPM) to an output RPM.

To adjust the ratio of an input RPM to an output RPM, there is a need for a configuration for controlling the relationships between gears. However, this configuration is disposed outside an input shaft or a rotating shaft and, thus, increases the size of a transmission and makes the structure thereof complicated.

DISCLOSURE

Technical Problem

An object of the present invention is to provide a gear moving assembly that can simplify a structure for shifting gears and reduce the size of a transmission, and a transmission including the gear moving assembly.

Another object of the present invention is to provide a gear moving assembly that enables operations for engagement with or release from pluralities of input and output gears to be rapidly performed, and a transmission including the gear moving assembly.

Technical Solution

In order to accomplish the above objects, an embodiment of the present invention provides a gear moving assembly, including a tubular shaft extending in a longitudinal direction, and having a hollow portion formed therein; a sliding unit including: a base disposed in the hollow portion of the shaft, with a plurality of sliding channels extending in the longitudinal direction being formed in an outer circumferential surface of the base at positions circumferentially spaced apart from each other; and a plurality of sliders including respective rods that are disposed in the respective sliding channels to be slidable relative to the shaft in the longitudinal direction; a plurality of movable gears disposed around a circumferential surface of the shaft to be movable relative to the shaft in the longitudinal direction, and provided to correspond to the respective sliders; and a plurality of interlocking units configured to connect the sliders to the corresponding movable gears so that sliding of each of the sliders is independently interlocked with movement of the corresponding movable gear.

In the gear moving assembly, moving slots extending in the longitudinal direction may be formed in the shaft, and the interlocking units may be disposed through the respective moving slots and each includes a connection pin connecting each of the movable gears to the corresponding slider.

In the gear moving assembly, each of the interlocking units may further includes a rotating ring rotatably provided on the corresponding slider and configured to be connected to a first end of the connection pin.

In the gear moving assembly, the sliding channels may be configured to communicate with an outside of the base, and each of the sliders may further include a receiving ring, including an inner surface configured such that a first end of the corresponding rod is coupled thereto and an outer surface having therein a receiving part that receives the rotating ring.

The gear moving assembly may further include a drive unit provided to slide the rods in the longitudinal direction.

In the gear moving assembly, each of the sliders may further include a wing provided on a second end of the rod, and the drive unit may include a traction module configured to receive therein any one of the wings and draw the selected wing to either side in the longitudinal direction.

In the gear moving assembly, the traction module may include a main body configured to be movable to either side in the longitudinal direction, and a fork part extending from the main body and bifurcated to cover opposite surfaces of the wing.

In the gear moving assembly, the traction module may include a frame configured such that free ends of the wings are coupled thereto; a plurality of pins disposed in the frame at positions corresponding to the respective wings; and a rotating plate rotatably installed at positions corresponding to free ends of the pins, and including a protrusion part that engages with any one of the pins by rotation of the rotating plate and causes the pin back to move the corresponding wing backward.

In the gear moving assembly, the drive unit may further include a change module configured to rotate the sliding unit around an axis located along the longitudinal direction so that any one of the wings other than the already selected wing is selected.

In the gear moving assembly, a plurality of open slots each allowing the corresponding sliding channel to communicate with an outside of the base may be formed in the base, the rods may be configured to be longer than the open slots, and each of the sliders may further include a receiving ring, including an inner surface coupled to the corresponding rod through the related open slot and an outer surface having therein a receiving part that receives the rotating ring.

The gear moving assembly may further include a fluid control module configured to supply fluid into the sliding channels or draw fluid out of the sliding channels so that the rods slide to either side along the longitudinal direction.

Another embodiment of the present invention provides a transmission including an input device including a plurality of input gears having different sizes; and an output device including a plurality of output gears having different sizes; wherein at least one of the input device and the output device comprises the gear moving assembly of claim 1, in which the shaft is an input shaft in a case of the input device and an output shaft in a case of the output device and each of the movable gears is configured to couple or decouple the corresponding input/output gear to or from the input/output shaft through the movement.

Still another embodiment of the present invention provides a transmission including an input device including a plurality of input gears having different sizes; and an output device including a plurality of output gears having different sizes; wherein at least one of the input device and the output device comprises: a hollow shaft extending in a longitudinal direction, and having moving slots formed therein; a sliding unit including: a base disposed in the hollow portion of the shaft, with a plurality of sliding channels extending in the longitudinal direction being formed in an outer circumferential surface of the base at positions circumferentially spaced apart from each other; and a plurality of sliders including respective rods that are disposed in the respective sliding channels to be slidable relative to the shaft in the longitudinal direction; a plurality of connection pins disposed through the respective moving slots, and each including a first end interlocked with sliding of the corresponding slider; and the input gears or the output gears configured to be independently interlocked with remaining ends of the respective connection pins.

In the transmission, each of the input or output gears may include a cylindrical body; and a gear part formed at an end of the body along a circumferential direction of the body.

Advantageous Effects

According to a gear moving assembly and a transmission including the same related to the present invention, principal components for shifting gears are disposed inside a shaft and the operation method thereof is simplified, thereby simplifying the structure and operation of the transmission and also reducing the size thereof.

In addition, according to a gear moving assembly and a transmission including the same related to the present invention, operations for engagement with or release from input or output gears can be rapidly performed.

MODE FOR INVENTION

Figure 1:
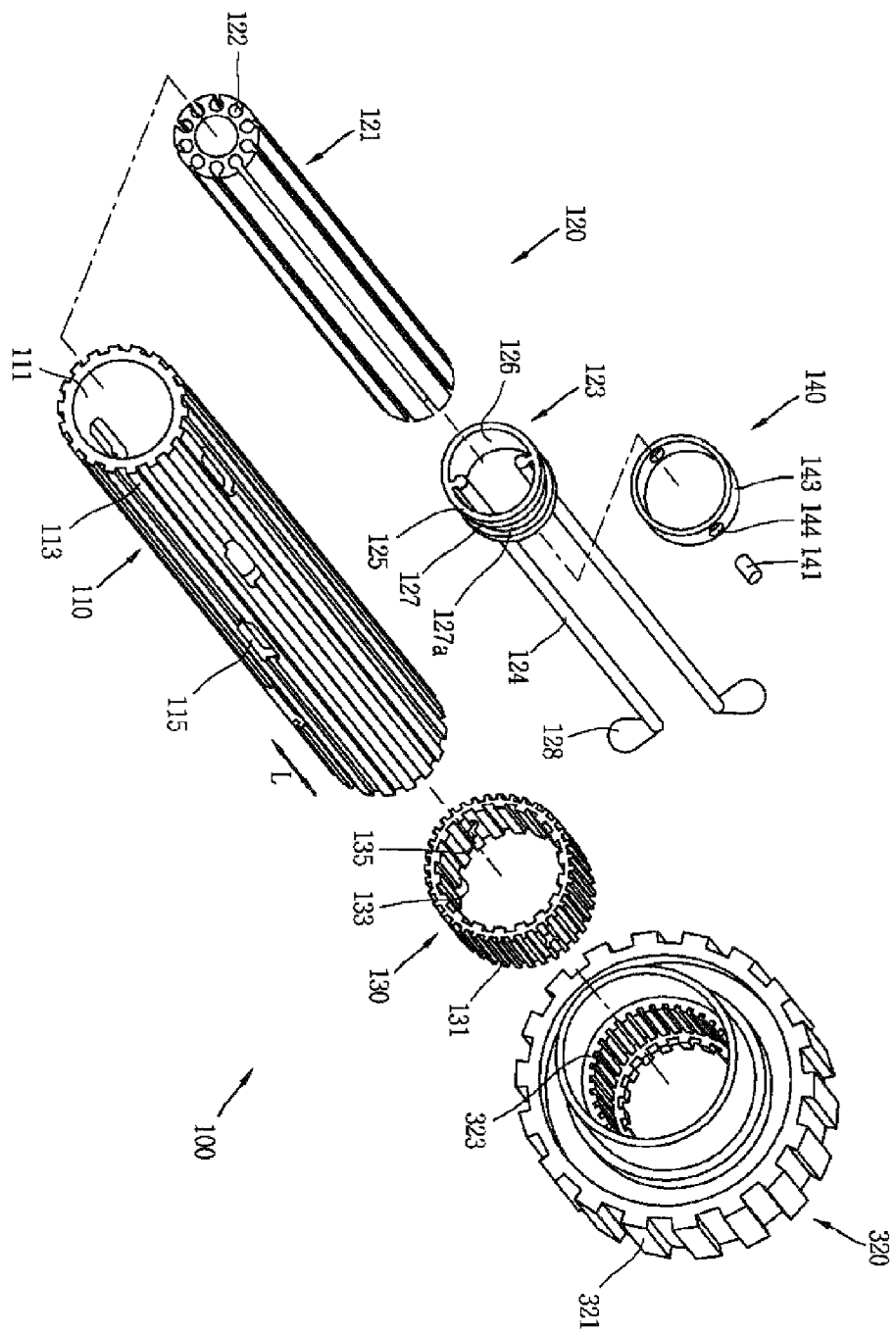
FIG. 1 is an exploded perspective view of a gear moving assembly (100) according to an embodiment of the present invention.

Hereinafter, a gear moving assembly and a transmission including the same according to preferred embodiments of the present invention will be described in detail with reference to the accompanying drawings. In this specification, the same or similar reference numerals are assigned to the same or similar components throughout different embodiments, and redundant detailed descriptions thereof will be omitted.

FIG. 1 is an exploded perspective view of a gear moving assembly 100 according to an embodiment of the present invention.

Referring to this drawing, the gear moving assembly 100 may include a shaft 110, a sliding unit 120, a movable gear 130, and an interlocking unit 140.

The shaft 110 is a hollow body that is formed to extend in a longitudinal direction L. Accordingly, a hollow portion 111 is defined inside the shaft 110. The shaft 110 may be formed in a tubular shape. Shaft gear teeth 113 extending in the longitudinal direction L are formed along the outer circumferential surface of the shaft 110. A moving slot 115 open in the longitudinal direction L is formed through the shaft 110.

The sliding unit 120 is disposed in the hollow portion 111 of the shaft 110. In detail, the sliding unit 120 may include a base 121 and a slider 123.

The base 121 is formed to extend in the longitudinal direction L. Although the base 121 is illustrated as having a tubular shape in the same manner as the shaft 110 in this embodiment, the base 121 may have a solid shape. A plurality of sliding channels 122 are formed in an outer circumferential surface of the base 122 and circumferentially spaced apart from each other at predetermined intervals. In accordance with an even number of rods 124, the sliding channels 122 may be also formed to be even in number. In this drawing, an example having ten sliding channels 122 is illustrated. The sliding unit 120 is formed to communicate with the outside through the outer circumferential surface of the base 121.

The slider 123 is combined with the base 121 to be slidable in the longitudinal direction L. More specifically, the slider 123 includes rods 124, a receiving ring 125, and wings 128. The rods 124 each have a size that enables the rod 4 to be slidably inserted into the corresponding sliding channel 122. The receiving ring 125 is formed in an annular shape, and includes an inner surface 126 configured such that the rods 124 are coupled thereto, and an outer surface 127 configured to have a receiving part 127a therein. The receiving part 127a is formed such that opposite side portions thereof protrude and a center portion thereof is depressed.

In the sliding unit 120 having the above-described configuration, the base 121 is disposed at the center, and the receiving ring 125 is provided around the outer circumferential surface of the base 121. Both the base 121 and the receiving ring 125 are disposed in the hollow portion 111 of the shaft 110. The base 121, the receiving ring 125 and the shaft 110 are concentrically arranged around a center of the shaft 110 with respect to the radial direction of the shaft 110. As described above, the rods 124 are inserted into the corresponding sliding channels 122. The wings 128 are disposed outside the shaft 110.

The movable gear 130 is an annular gear and is provided around the outer circumferential surface of the shaft 110. The movable gear 130 includes external gear teeth 131 that are provided on an outer surface thereof, and internal gear teeth 133 that are provided on an inner surface thereof. The internal gear teeth 133 have a size appropriate to allow the internal gear teeth 133 to engage with the shaft gear teeth 113 of the shaft 110. A connection hole 135 is formed in the movable gear 130.

The interlocking unit 140 interlocks sliding of the slider 123 with movement of the movable gear 130. The interlocking unit 140 includes a connection pin 141 and a rotating ring 143. A first end of the connection pin 141 is connected to the receiving part 127a of the receiving ring 125. A second end of the connection pin 141 is connected to the connection hole 135 of the movable gear 130. For this, the connection pin 141 is disposed through the moving slot 115 of the shaft 110. The connection pin 141 may be directly connected to the receiving ring 125. Alternatively, the connection pin 141 may be connected to the receiving ring 125 by the rotating ring 143. In the latter case, the rotating ring 143 is fitted into the receiving part 127a of the receiving ring 125, and the connection pin 141 is inserted into an insert hole 144 of the rotating ring 143.

According to the above-described configuration, when the wings 128 are moved to either side along the longitudinal direction L, the rods 124 slide along the corresponding sliding channels 122. The sliding of the rods 124 is accompanied both with the sliding of the receiving ring connected to the rods 124 and with the sliding of the connection pin 141 connected to the receiving ring 125. The connection pin 141 may slide back and forth in the longitudinal direction L within a range corresponding to the length of the moving slot 115. The sliding of the connection pin 141 causes movement of the movable gear 130 connected to the second end of the connection pin 141. The movable gear 130 is also moved within a range corresponding to the length of the moving slot 115 and thus inserted into a speed-changing gear, e.g., an input gear (320; see the drawing), or separated therefrom. When the movable gear 130 is inserted into the input gear 320, the external gear teeth 131 of the movable gear 131 engage with internal gear teeth 323 of the input gear 320.

When the movable gear 130 engages with the input gear 320, the input gear 320 can be rotated by the rotating force of the shaft 110. When the movable gear 130 is removed from the input gear 320, the input gear 320 cannot be rotated even when the shaft 110 rotates.

As described above, a configuration for moving the movable gear 130 is installed in the shaft 110. Hence, the configuration for moving the movable gear 130 is able to simplify the structure of the assembly 100 and makes it possible to reduce the size of the assembly 100, unlike that of the conventional technique.

Although only the slider 123 has been described above, other sliders having the same configuration are further provided. In detail, each of the plurality of sliders 123 includes a receiving ring 125, a rod 124, and wings 128. The receiving rings 125 of the sliders 123 are arranged in a row on the base 121 at positions space apart from each other in the longitudinal direction L. The rods 124 of the sliders 123 are respectively inserted into the sliding channels 122. The wings 128 are arranged in different orientations to form an imaginary circle. In this embodiment, five sliders 123 are provided, including five pairs of sliding channels 122, five pairs of moving slots (115; two pairs are not shown), and five pairs of connection pins (141, only one pair is shown).

As described above, the rods 124 must be able to move in the longitudinal direction L so as to operate the assembly 1000. This will be described with reference to FIG. 2.

Figure 2:
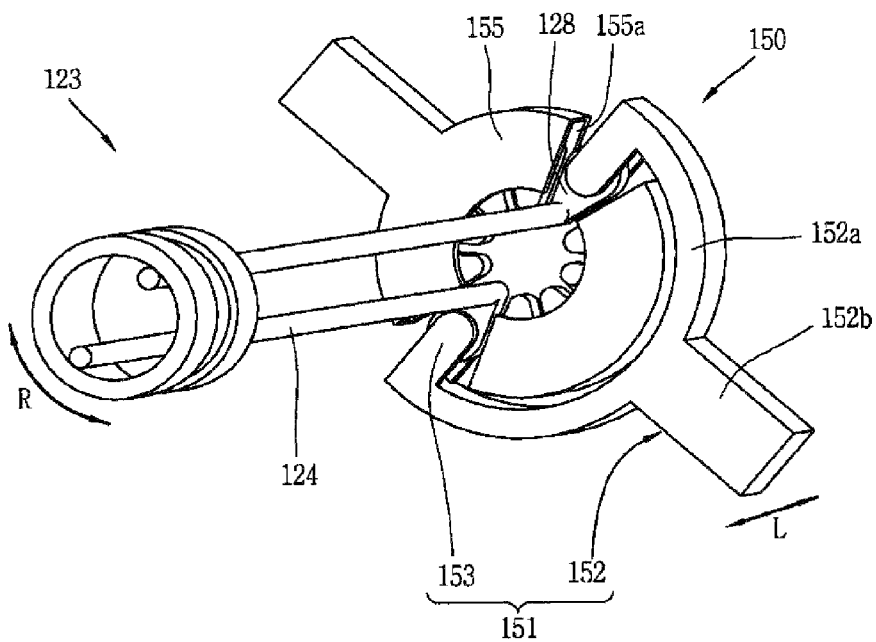
FIG. 2 is a perspective view illustrating the slider (123) of the gear moving assembly (100) of FIG. 1, and a drive unit (150)

FIG. 2 is a perspective view illustrating the slider 123 of the gear moving assembly 100 of FIG. 1, and a drive unit 150.

Referring to this drawing, the drive unit 150 is provided to slide the rods 125 in the longitudinal direction L.

The drive unit 150 includes a traction module 151 that receives therein some of the wings 128 and moves the selected wings 128 to either side along the longitudinal direction L.

The traction module 151 includes a main body 152, fork parts 153, and a stopper 155. The main body 152 is configured to be movable to either side along the longitudinal direction L. In detail, the main body 152 includes a semi-circular part 152a extending in a semicircular shape, and a protrusion part 152b protruding from a medial portion of the semicircular part 152a. The fork parts 153 extend from the main body 152, in detail, from respective opposite ends of the semicircular part 152a. Each fork part 153 has a bifurcated structure to cover opposite surfaces of the corresponding wing 128. The stopper 155 is disposed at a position opposed to the main body 152 and the fork part 153. The stopper 155 has therein an inner space 155a for receiving the corresponding wings 128.

In the above-described configuration, when the main body 152, in detail, the protrusion part 152b, is moved in any one direction along the longitudinal direction L, the fork parts 153 that receive force from the main body 152 move the corresponding wings 128 in the direction in which the force is applied to the fork parts 153. Thereby, the wings 128 and the slider 123 including the wings 128 slide in one direction along the longitudinal direction L. For instance, a cylinder may be used to slide the main body 152 in the longitudinal direction L.

In detail, FIG. 2 illustrates conditions in which all of the wings 128 (i.e., all of the sliders 123) are retreated [thereby, all of the movable gears 130 are removed from the input gear (320; see FIG. 1)]. In this state, when the wings 128 pertaining to the fork parts 153 are moved to the left on the drawing, the corresponding slider 123 is also moved in the same direction. Thereby, the movable gear 130 corresponding to this slider 123 engages with the corresponding input gear (320; see FIG. 1). The wings 128 that do not pertain to the fork parts 153 remain in place without moving in the longitudinal direction L because the wings 128 are disposed in and stopped by the stopper 155.

To dispose specific ones of the wings 128 at positions corresponding to the fork parts 153, the sliders 123 must be rotated in a rotating direction R (a rotating direction using around the longitudinal direction L as an axis of rotation). A change module 161 for rotating the sliders 123 will be described later with reference to FIG. 5.

Another traction module 155 that is a modification of the traction module 151 will be described with reference to FIG. 3.

Figure 3:
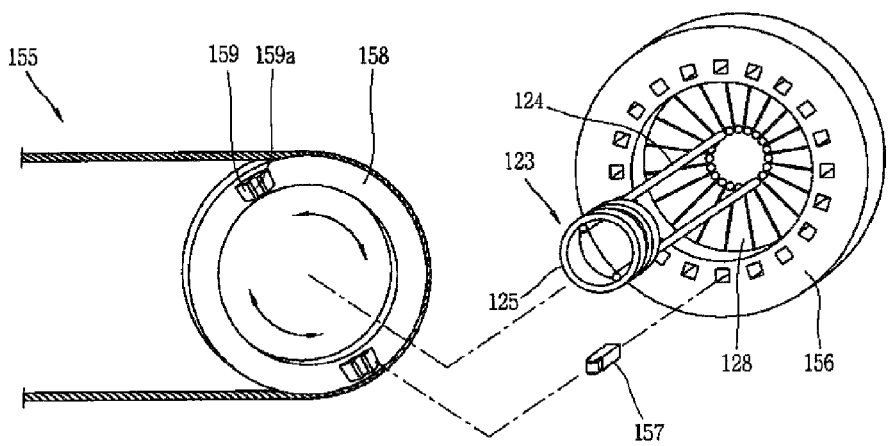
FIG. 3 is a perspective view illustrating a traction module (155) according to a modification of the traction Module (151) of the drive unit (150) of FIG. 2, and the slider (123)

FIG. 3 is a perspective view illustrating the traction module 155 according to the modification of the traction module 151 of the drive unit 150 of FIG. 2, and the slider 123.

Referring to FIG. 3, the traction module 155 includes a frame 156, pins 157, and a rotating plate 158.

The frame 156 substantially has an annular shape. The wings 128 are coupled to an open central portion of the frame 156. The rods 124 connected to the respective wings 128 are disposed at a center of the frame 156.

The pins 157 are embedded into a perimeter of the frame 156 at positions corresponding to the wings 128. The pins 157 are oriented parallel to the rods 124. A free end of each pin 157 is disposed at a side adjacent to the receiving ring 125.

The rotating plate 158 has a shape corresponding to the frame 156. For example, the rotating plate 158 may have an annular shape with a size corresponding to that of the frame 156. Protrusion parts 159 are provided on a surface of the rotating plate 158 that faces the frame 156. A stop recess 159a is formed in a central portion of each protrusion part 159.

When the rotating plate 158 is rotated around an axis located along the longitudinal direction L, the pins 157 are moved in the circumferential direction relative to the rotating plate 158. When the protrusion parts 159 of the rotating plate 158 come into contact with the pins 157, the pins 157 are retreated away from the rotating plate 158 by the protrusion parts 159 in the longitudinal direction L. Then, the pins 157 push the corresponding wings 128 in the direction away from the rotating plate 158. Thereby, the corresponding rods 124 and receiving ring 125 slide in the direction away from the rotating plate 158. The degree by which the rods 124 and the receiving ring 125 slide is comparatively small. This is useful in the case where it is sufficient if there is only a small displacement.

During the retreat movement of the pins 157, the free end of each pin 157 is received in the corresponding stop recess 159a. Thereby, each pin 159 engages with the corresponding protrusion part 159, and may be reliably maintained in the retreated state. To make it smoother for the pins 157 to cross over the protrusion parts 159, a wheel may be installed on the free end of each pin 157.

A configuration for rotating the rotating plate 158 may include a belt that is wrapped around an outer circumferential surface of the rotating plate 158, and a circular plate for driving the belt. Alternatively, the rotating plate 158 may be made of a gear, and a drive gear engaging with the rotating plate 158 may be provided.

Hitherto, the gear moving assembly 100 that embodies the sliding of the slider 123 in a mechanical fashion has been described. Hereinafter, a gear moving assembly 200 that embodies the sliding of the slider 123 in a hydraulic fashion will be described with reference to FIG. 4.

Figure 4:
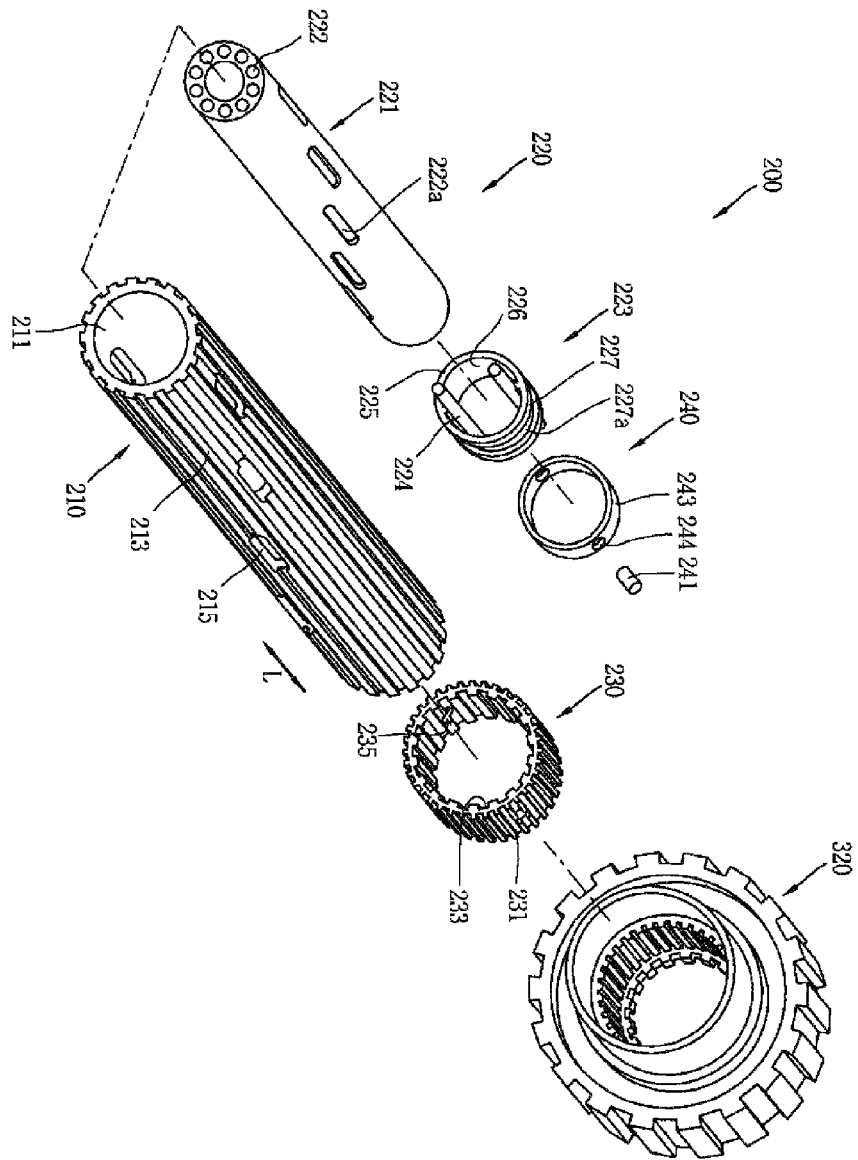
FIG. 4 is an exploded perspective view of a gear moving assembly (200) according to another embodiment of the present invention.

FIG. 4 is an exploded perspective view of a gear moving assembly 200 according to another embodiment of the present invention.

As shown in the drawing, the general configuration of the gear moving assembly 200 is similar to that of the gear moving assembly 100 according to the preceding embodiment.

In detail, the gear moving assembly 200 includes a shaft 210, a sliding unit 220, a movable gear 230, and an interlocking unit 240. The shaft 210, the movable gear 230, and the interlocking unit 240 respectively have the same structure as those of the shaft 110, the movable gear 130, and the interlocking unit 140.

The sliding unit 220 having a structure different from that of the preceding embodiment will be described in detail. The sliding unit 220 includes a base 221 and a slider 223.

The base 221 has sliding channels 222 and is configured such that the sliding channels 222 are substantially blocked from the outside rather than communicating with the outside through the outer circumferential surface of the base 221. In other words, the sliding channels 222 is formed and extended in the base 221. The sliding channels 222 only partially communicate with the outside through respective open slots 222a. Each sliding channel 222 extends a length from an end of the base 221 to a predetermined point over the corresponding open slot 222a. Thus, the sliding channel 222 that corresponds to the open slot 222a closest to the end of the base 221 is shortest.

The rods 224 of the slider 223 are connected to the inner surface 226 of the receiving ring 225. Both ends of each rod 224 are respectively disposed on opposite sides of the receiving ring 225 in the longitudinal direction L. The rods 224 are made of flexible material so that each rod 224 may be inserted into the corresponding sliding channel 222 through the related open slot 222a in such a way that both ends of the rod 224 are close to each other and are inserted into the open slot 222a.

In connection with the sliding channels 222, a fluid control module supplying fluid into the sliding channels 222 or drawing fluid out of the sliding channels 222 may be further included. The fluid control module includes a tank that stores fluid therein, a pump that pumps fluid into the sliding channels 222, and tubes that connect the pump to the respective sliding channels 222 and the tank.

A rotary pump, which may be reversely rotated, is used as the pump so that both operations of supplying fluid into the sliding channels 222 and drawing fluid out of the sliding channels 222 may be performed.

To slide the slider 223 in the longitudinal direction L to the right on the drawing, the fluid control module is operated such that fluid is supplied into the corresponding sliding channels 222. The supplied fluid compresses the rods 224, whereby the rods 224 and the receiving ring 225 are moved to the right along the sliding channels 222

To slide the slider 223 in the longitudinal direction L to the left on the drawing, the fluid control module is reversely operated such that the fluid that has been supplied into the sliding channels 222 is drawn out of them. Then, the rods 224 are moved to the left by the suction force, whereby the receiving ring 225 slides to the left.

In the hydraulic assembly having the above-described configuration, there is only a need to connect the fluid supply and retrieval tubes to the respective sliding channels 222, and neither the wing 128 nor the change module (161; see FIG. 5) is required to be provided, unlike the mechanical assembly 100.

Hereinafter, a transmission using the gear moving assembly 100 or 200 will be described with reference to FIG. 5 or 6.

Figure 5:
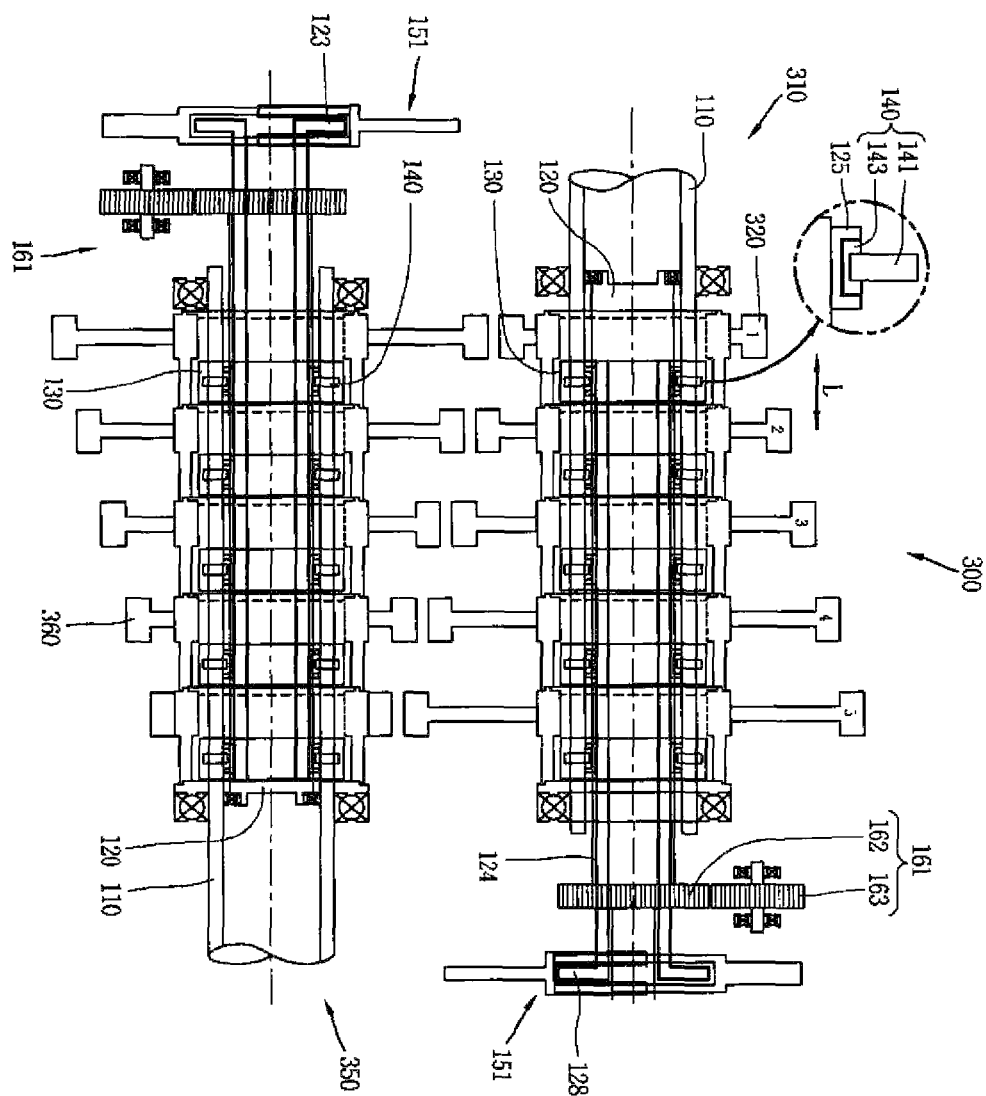
FIG. 5 is a conceptual sectional view illustrating a transmission (300) according to a further embodiment of the present invention.

FIG. 5 is a conceptual sectional view illustrating a transmission 300 according to a further embodiment of the present invention.

Referring to this drawing, the transmission 300 includes an input device 310 and an output device 350. The input device 310 and the output device 350 respectively include a plurality of input gears 320 and a plurality of output gears 360. Depending on a manner in which the input gears 320 engage with the output gears 360, a ratio of an input speed applied to the input device 310 to a speed output from the output device 350 is varied.

At least either the input device 310 or the output device 350 employs the above-described gear moving assembly 100 or 200. For instance, in this embodiment, the gear moving assembly 100 according to the first embodiment is used in both the input device 310 and the output device 350.

For the input device 310, the shaft 110 of the gear moving assembly 100 functions as an input shaft. The sliding unit 120 is disposed in the shaft 110. The movable gear 130 interlocked with the slider 123 by the interlocking unit 140 is disposed to be engaged with or released from the input gear 320.

As given in the description of FIG. 2, it is necessary to rotate the base 121 provided with the rods 124 around the axis located along the longitudinal direction L in order to select a desired one from among the rods 124. For this purpose, the change module 161 is provided. The change module 161 includes a driven gear 162 that is installed on the base 221 and a drive gear 163 that rotates the driven gear 162. The rotation of the drive gear 163 may be performed by a motor connected thereto. The desired rods 224 may be disposed at positions corresponding to the fork parts (153; see FIG. 2) of the traction module 151 in such a way that the change module 161 rotates the rods 124.

Like in the input device 310, in the case of the outer device 350, the shaft 110 of the gear moving assembly 100 acts as an output shaft. The sliding unit 120 is provided in the shaft 110. The movable gear 130 interlocked with the slider 123 by the interlocking unit 140 is disposed to be engaged with or released from the output gear 360.

More specifically, in the above-described configuration, a plurality of input gears 320 or a plurality of output gears 360 are provided, and movable gears 130 and sliding units 120 for sliding the respective movable gears 130 are provided for the respective input gears 320 or the output gears 360. The sliding motion of the sliding units 120 and the movable gears 130 is independent of each other, and thus an operation for engagement with or release from the input gears 320 or the output gears 360 can be rapidly performed.

Figure 6:
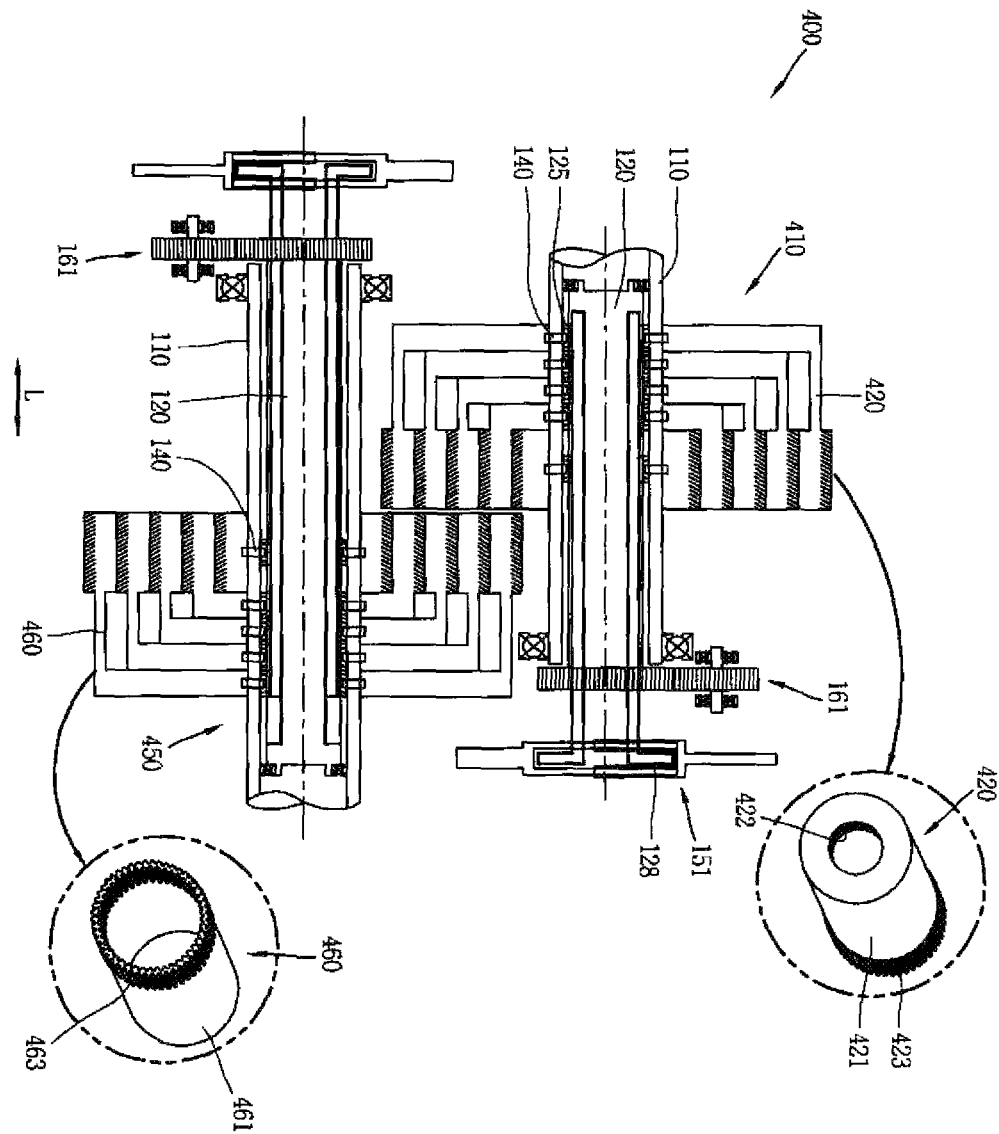
FIG. 6 is a conceptual sectional view illustrating a transmission (400) according to yet another embodiment of the present invention.

FIG. 6 is a conceptual sectional view illustrating a transmission 400 according to yet another embodiment of the present invention.

Referring to this drawing, the transmission 400 includes an input device 410 and an output device 450.

At least either the input device 410 or the output device 450 employs a modification of the gear moving assembly 100 or 200. For instance, in this embodiment, a modification of the gear moving assembly 100 is used in both the input device 410 and the output device 450.

More specifically, for the input device 410, the shaft 110 of the gear moving assembly 100 functions as an input shaft. The sliding unit 120 is disposed in the shaft 110. The connection pin 141 of the interlocking unit 140 connected to the slider 123 is fastened to an input gear 420. In other words, the connection pin 141 is directly connected to the input gear 420 without the movable gear 130 for the gear moving assembly 100 of the first embodiment.

The input gear 420 includes a body 421 and a gear part 423. The body 421 has a cylindrical shape. A first end of the body 412 is completely open, and a second end of the body 412 is open only in the central portion thereof. The opening formed in the central portion of the second end of the body 412 has a size that enables the shaft 110 to pass through the opening. A receiving recess 422 is formed through the inner circumferential surface of the opening. An end of the connection pin 141 is inserted into the receiving recess 422.

In response to the input gear 420, the output gear 460 may also include a body 461 and a gear part 463. Accordingly, when the connection pin 141 slides in the longitudinal direction L, the input gear 420 and/or the output gear 460 is moved, and the input gear 420 and the output gear 460 engage with each other. In this state, power input to the input device 410 is output through the output device 450 after the conversion of power.

The gear moving assembly and the transmission including the same according to the present invention are not limited to the configurations and operations of the above-described embodiments. The above-described embodiments may be configured such that various modifications can be made by the selective combination of all or some of the embodiments.

DESCRIPTION OF REFERENCE SYMBOLS 100,200: gear moving assembly 110,210: shaft
120,220: sliding channel 123,223: slider
130,230: movable gear 140,240 interlocking unit
150: drive unit 151,155: traction module
161: change module 300,400: transmission
310,410: input device 320,420: input gear
350,450: output device 360,460: output gear

The invention claimed is:

1. A gear moving assembly, comprising:
a tubular shaft extending in a longitudinal direction, and having a hollow portion formed therein;
a sliding unit including:
a base disposed in the hollow portion of the shaft, with a plurality of sliding channels extending in the longitudinal direction being formed in an outer circumferential surface of the base at positions circumferentially spaced apart from each other; and
a plurality of sliders including respective rods that are disposed in the respective sliding channels to be slidable relative to the shaft in the longitudinal direction;
a plurality of movable gears disposed around a circumferential surface of the shaft to be movable relative to the shaft in the longitudinal direction, and provided to correspond to the respective sliders; and
a plurality of interlocking units configured to connect the sliders to the corresponding movable gears so that sliding of each of the sliders is independently interlocked with movement of the corresponding movable gear.

2. The gear moving assembly of claim 1, wherein moving slots extending in the longitudinal direction are formed in the shaft, and the interlocking units are disposed through the respective moving slots and each comprise a connection pin connecting each of the movable gears to the corresponding slider.

3. The gear moving assembly of claim 2, wherein each of the interlocking units further comprises a rotating ring rotatably provided on the corresponding slider and configured to be connected to a first end of the connection pin.

4. The gear moving assembly of claim 3, wherein the sliding channels are configured to communicate with an outside of the base, and each of the sliders further comprise a receiving ring, including an inner surface configured such that a first end of the corresponding rod is coupled thereto and an outer surface having therein a receiving part that receives the rotating ring.

5. The gear moving assembly of claim 4, further comprising a drive unit provided to slide the rods in the longitudinal direction.

6. The gear moving assembly of claim 5, wherein each of the sliders further comprises a wing provided on a second end of the rod, and the drive unit comprises a traction module configured to receive therein any one of the wings and draw the selected wing to either side in the longitudinal direction.

7. The gear moving assembly of claim 6, wherein the traction module comprises:
a main body configured to be movable to either side in the longitudinal direction; and
a fork part extending from the main body, and bifurcated to cover opposite surfaces of the wing.

8. The gear moving assembly of claim 6, wherein the traction module comprises:
a frame configured such that free ends of the wings are coupled thereto;
a plurality of pins disposed in the frame at positions corresponding to the respective wings; and
a rotating plate rotatably installed at positions corresponding to free ends of the pins, and including a protrusion part that engages with any one of the pins by rotation of the rotating plate and causes the pin back to move the corresponding wing backward.

9. The gear moving assembly of claim 6, wherein the drive unit further comprises a change module configured to rotate the sliding unit around an axis located along the longitudinal direction so that any one of the wings other than the already selected wing is selected.

10. The gear moving assembly of claim 3, wherein a plurality of open slots each allowing the corresponding sliding channel to communicate with an outside of the base are formed in the base, the rods are configured to be longer than the open slots, and each of the sliders further comprises a receiving ring, including an inner surface coupled to the corresponding rod through the related open slot and an outer surface having therein a receiving part that receives the rotating ring.

11. The gear moving assembly of claim 10, further comprising a fluid control module configured to supply fluid into the sliding channels or draw fluid out of the sliding channels so that the rods slide to either side along the longitudinal direction.

12. A transmission comprising:
an input device including a plurality of input gears having different sizes; and
an output device including a plurality of output gears having different sizes;
wherein at least one of the input device and the output device comprises the gear moving assembly of claim 1, in which the shaft is an input shaft in a case of the input device and an output shaft in a case of the output device and each of the movable gears is configured to couple or decouple the corresponding input/output gear to or from the input/output shaft through the movement.

13. A transmission comprising:
an input device including a plurality of input gears having different sizes; and
an output device including a plurality of output gears having different sizes;
wherein at least one of the input device and the output device comprises:
a hollow shaft extending in a longitudinal direction, and having moving slots formed therein;
a sliding unit including: a base disposed in the hollow portion of the shaft, with a plurality of sliding channels extending in the longitudinal direction being formed in an outer circumferential surface of the base at positions circumferentially spaced apart from each other; and a plurality of sliders including respective rods that are disposed in the respective sliding channels to be slidable relative to the shaft in the longitudinal direction;
a plurality of connection pins disposed through the respective moving slots, and each including a first end interlocked with sliding of the corresponding slider; and
the input gears or the output gears configured to be independently interlocked with remaining ends of the respective connection pins.

14. The transmission of claim 13, wherein the input or output gears each comprise:
a cylindrical body; and
a gear part formed at an end of the body along a circumferential direction of the body.

* * * * *